US012149422B2

(12) United States Patent
Burton

(10) Patent No.: US 12,149,422 B2
(45) Date of Patent: *Nov. 19, 2024

(54) QUERY PRINTS (Qprints): TELEMETRY-BASED SIMILARITY FOR DNS

(71) Applicant: Infoblox Inc., Santa Clara, CA (US)

(72) Inventor: Renée Carol Burton, Seattle, WA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,218

(22) Filed: May 22, 2023

(65) Prior Publication Data

US 2023/0403216 A1  Dec. 14, 2023

Related U.S. Application Data

(63) Continuation of application No. 17/535,226, filed on Nov. 24, 2021, now Pat. No. 11,695,667.

(60) Provisional application No. 63/118,259, filed on Nov. 25, 2020.

(51) Int. Cl.
*H04L 43/067* (2022.01)
*H04L 43/04* (2022.01)
*H04L 43/0817* (2022.01)
*H04L 61/4511* (2022.01)

(52) U.S. Cl.
CPC ............ *H04L 43/067* (2013.01); *H04L 43/04* (2013.01); *H04L 43/0817* (2013.01); *H04L 61/4511* (2022.05)

(58) Field of Classification Search
CPC ... H04L 43/067; H04L 43/04; H04L 43/0817; H04L 61/4511; H04L 41/142
See application file for complete search history.

(56) References Cited

U.S. PATENT DOCUMENTS

| 2016/0294859 A1* | 10/2016 | Choi ...................... G06F 21/00 |
| 2017/0295196 A1* | 10/2017 | Arnell ................. H04L 61/4511 |
| 2018/0262520 A1* | 9/2018 | Xu ....................... H04L 63/1425 |
| 2019/0238576 A1* | 8/2019 | Weber ................. H04L 63/1425 |

OTHER PUBLICATIONS

Author Unknown, How HDBSCAN Works, downloaded Nov. 22, 2021.

(Continued)

*Primary Examiner* — Anh Nguyen
(74) *Attorney, Agent, or Firm* — Van Pelt, Yi & James LLP

(57) ABSTRACT

Techniques for Qprints using telemetry-based similarity for DNS are provided. In some embodiments, a system/process/computer program product for Qprints using telemetry-based similarity for DNS in accordance with some embodiments includes aggregating a set of network related event data, wherein the set of network related event data includes Domain Name System (DNS) related query data; clustering the DNS related query data; and generating similarity clusters for domains based on their DNS related query data. For example, the set of network related event data can include passive DNS (pDNS) data aggregated over a period of time to express pDNS data at-scale, and similarity of the pDNS data aggregated over the period of time is quantified, within and across networks based on telemetry-based similarity for DNS using a statistical model.

20 Claims, 16 Drawing Sheets

(56) References Cited

OTHER PUBLICATIONS

Gupta et al., Sonata: Query-Driven Streaming Network Telemetry, SIGCOMM '18, Aug. 20-25, 2018, Budapest, Hungary, pp. 357-371.
Sivanathan et al., Managing IoT Cyber-Security Using Programmable Telemetry and Machine Learning, IEEE Transactions on Network and Service Management, vol. 17, No. 1, Mar. 2020, pp. 60-74.
Voronov et al., Determining OS and Applications by DNS Traffic Analysis, Jan. 2021, 2021 IEEE Conference of Russian Young Researchers in Electrical and Electronic Engineering, pp. 72-76.

* cited by examiner

| show_similar_domains('google.com', s | | | show_similar_domains('akamaiedge.net' | | | sld | | | domain | |
|---|---|---|---|---|---|---|---|---|---|---|
| sld_qtype | | | sld_qtype | | | | | | | |
| google.com | 1.000000 | | akamaiedge.net | 1.000000 | | sophosxl.net | 1.000000 | | busucak.com | 20719.0 |
| salesforce.com | 0.943686 | | tbcache.com | 0.999997 | | senderbase.org | 0.777116 | | butapujo.com | 20537.0 |
| facebook.com | 0.895679 | | ax4z.com | 0.999995 | | cymru.com | 0.699162 | | ddukmql.com | 20435.0 |
| microsoft.com | 0.890085 | | stackpathcdn.com | 0.999972 | | slb.net | 0.679826 | | hoduqoq.com | 20462.0 |
| twitter.com | 0.889696 | | paloaltonetworks.com | 0.999917 | | canon.ca | 0.620574 | | katunaq.com | 20573.0 |
| amazon.com | 0.878293 | | huawei.com | 0.999906 | | axessmps.com | 0.616760 | | lomokonu.com | 20557.0 |
| outlook.com | 0.870311 | | spo-msedge.net | 0.999906 | | opendns.com | 0.614369 | | qajolos.com | 20632.0 |
| ebay.com | 0.859098 | | cloudfront.net | 0.999879 | | e5.sk | 0.587534 | | rududulu.com | 20538.0 |
| aol.com | 0.858388 | | dynatrace.com | 0.999826 | | mcafee.com | 0.559741 | | wagng.com | 20607.0 |
| apple.com | 0.857413 | | amazonaws.com | 0.999810 | | clamav.net | 0.551304 | | wavbsly.com | 20644.0 |
| | | | | | | | | | yxhpa.com | 20624.0 |
| | | | | | | | | | zahirq.com | 20552.0 |

CDNs are Similar to Each Other

FIG. 2A

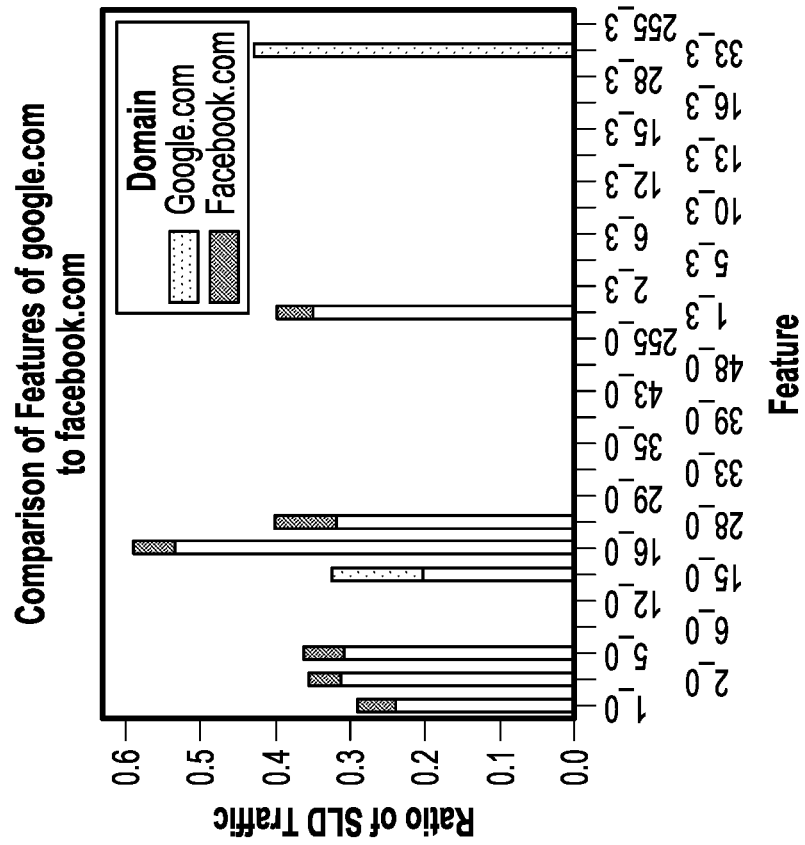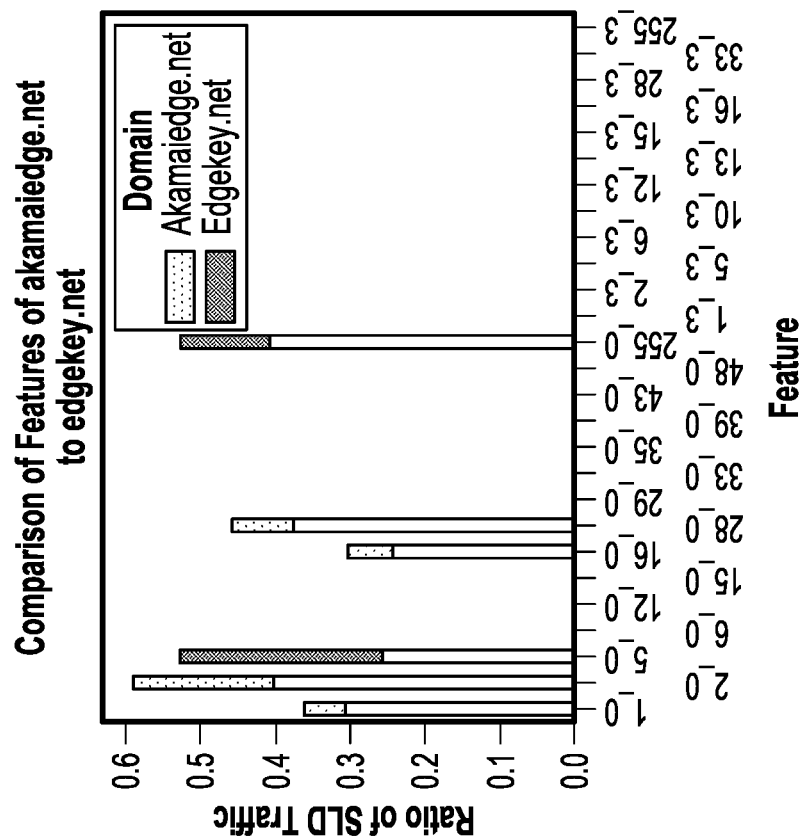
FIG. 2B

```
In [137]: clusters.reset_index().groupby('label').domain.apply(lambda x: x.sample(4).tolist())
Out[137]:
label
 -1   [epo-needgevnee, alteraveom, ebayreevoly, veganpiccaratrcom]
  0   [92.in-addr.arpa, 210.in-addr.arpa, 122.in-addr.arpa, 62.in-addr.arpa]
  1   [17.in-addr.arpa, 15.in-addr.arpa, 34.in-addr.arpa, 92.in-addr.arpa]
  2   [116.in-addr.arpa, 52.in-addr.arpa, 83.in-addr.arpa, 43.in-addr.arpa]
  3   [enecoxaxeijk.ri, intuit.com, magicnicks.com, catchpoint.com]
  4   [getresponse-mail.com, grouponmail.nl, cindercone.com, roche.com]
  5   [mybenefit.pl, sci.co.in, environment-agency.gov.uk, bauermedia.com.au]
  6   [ecampaign.pl, mcdonalds.de, mailgun.info, zcsend.net]
  7   [bookbeardroom, amazon.fr, weekday.com, nytime.com]
  8   [sntp2go.com, websitewelcome.com, bcee.lu, gfnorte.com.mx]
  9   [jdsports.co.uk, kyocera.biz, blogherads.com, rancher.io]
 10   [exelator.com, driftt.com, polycom.com, liveperson.net]
 11   [visualwebsiteoptimizer.com, cdxcn.net, footprint.net, plcn.cloud]
 12   [interpublic.com, frontiernet.net, vdc.vn, colocrossing.com]
 13   [amazon.com.my, omnitage.com, auegat.ie, applicationinsights.io]
 14   [onedrive-en-live.com, dns--google.com, joymax.in, 196.cc]
 15   [tdfpa.com, etuve.fr, gahuwa.com, burrow.io]
 16   [bulehero.in, shiashop.com, kr-mail.com, googledrive-download.com]
 17   [lastline.com, my-ehost.com, herbalsolo.com, capvote.fr]
 18   [thrtle.com, jobs2web.com, mrtedtalentlink.com, vuukle.com]
 19   [threatseeker.com, i7gd9ultgx.ru, adobe.io, spectraguard.net]
 20   [itsaol.com, 4300.top, coffeinoffice.xyz, ygto.com]
 21   [omokonu.com, yxhpa.com, ddukmql.com, wavbsly.com]
 22   [sogeti.org, stackadapt.com, blismedia.com, interface.web.tr]
 23   [openrent.co.uk, ntp.org, getgreenshot.org, gappssmtp.com]
 24   [downloadspider.com, uuserv10.net, update-srv2.info, adsuperiorstore.com]
 25   [m8374.net, ibnsupport.net, jgane.in, ssghzhit.com]
 26   [affitea.m, cocodna.com, sefiamit.net, chyporus.m]
 27   [behalfpermittedthe.ru, lbitwuh5.ru, liabilitytermmayliable.ru, fr4vkbdr.ru]
 28   [lffsxvw5df.ru, mua7p5u4.ru, lr69so6wl6l.ru, theeapriorlicensewit.ru]
Name: domain, dtype: object
```

FIG. 5A

In [876]: get_cluster_features(12, clusters=clusters, data=data)

Out [876]:

1_0

| domain | |
|---|---|
| busucak.com | 20719.0 |
| butapujo.com | 20537.0 |
| ddukmql.com | 20435.0 |
| hoduqoq.com | 20462.0 |
| katunaq.com | 20573.0 |
| lomokonu.com | 20557.0 |
| qajolos.com | 20632.0 |
| rududulu.com | 20538.0 |
| wagng.com | 20607.0 |
| wavbsly.com | 20644.0 |
| yxhpa.com | 20624.0 |
| zahirq.com | 20552.0 |

FIG. 5B

Comparison of Top 10 Matches to sophosxl.net Using 3 Similarities

| sld | joint | sld | tfidf_only | sld | qratio_only |
|---|---|---|---|---|---|
| sophosxl.net | 1.000000 | sophosxl.net | 1.000000 | sophosxl.net | 1.000000 |
| senderbase.org | 0.777116 | senderbase.org | 0.976568 | 143.in-addr.arpa | 0.948251 |
| cymru.com | 0.699162 | canon.ca | 0.976209 | 215.in-addr.arpa | 0.926089 |
| slb.net | 0.679826 | cymru.com | 0.975283 | 214.in-addr.arpa | 0.925710 |
| canon.ca | 0.620574 | opendns.com | 0.960443 | wayport.net | 0.921642 |
| axessmps.com | 0.616760 | axessmps.com | 0.957318 | 153.in-addr.arpa | 0.920217 |
| opendns.com | 0.614369 | kerberos.com | 0.772743 | kugou.com | 0.919231 |
| e5.sk | 0.587534 | connectedpdf.com | 0.767634 | 196.in-addr.arpa | 0.913861 |
| mcafee.com | 0.559741 | slb.net | 0.686085 | footprintdns.com | 0.913373 |
| clamav.net | 0.551304 | ibm.com | 0.640832 | 189.in-addr.arpa | 0.908386 |

FIG. 8

QUERY PRINTS (Qprints): TELEMETRY-BASED SIMILARITY FOR DNS

CROSS REFERENCE TO OTHER APPLICATIONS

This application is a continuation of U.S. patent application Ser. No. 17/535,226, entitled QUERY PRINTS (QPRINTS): TELEMETRY-BASED SIMILARITY FOR DNS filed Nov. 24, 2021 which is incorporated herein by reference for all purposes, which claims priority to U.S. Provisional Patent Application No. 63/118,259 entitled QPRINTS: TELEMETRY-BASED SIMILARITY FOR DNS filed Nov. 25, 2020, which is incorporated herein by reference for all purposes.

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain).

BRIEF DESCRIPTION OF THE DRAWINGS

Various embodiments of the invention are disclosed in the following detailed description and the accompanying drawings.

FIG. 2A illustrates results for domain similarity using query prints (Qprints) in accordance with some embodiments.

FIG. 2B illustrates results for domain similarity by feature distribution using Qprints in accordance with some embodiments.

FIG. 5A illustrates representative clusters by query volume in accordance with some embodiments.

FIG. 5B illustrates another representative cluster by query volume in accordance with some embodiments.

FIG. 8 illustrates a comparison of the top 10 matches to sophosxl.net using three similarities in accordance with some embodiments.

DETAILED DESCRIPTION

Figure 1:
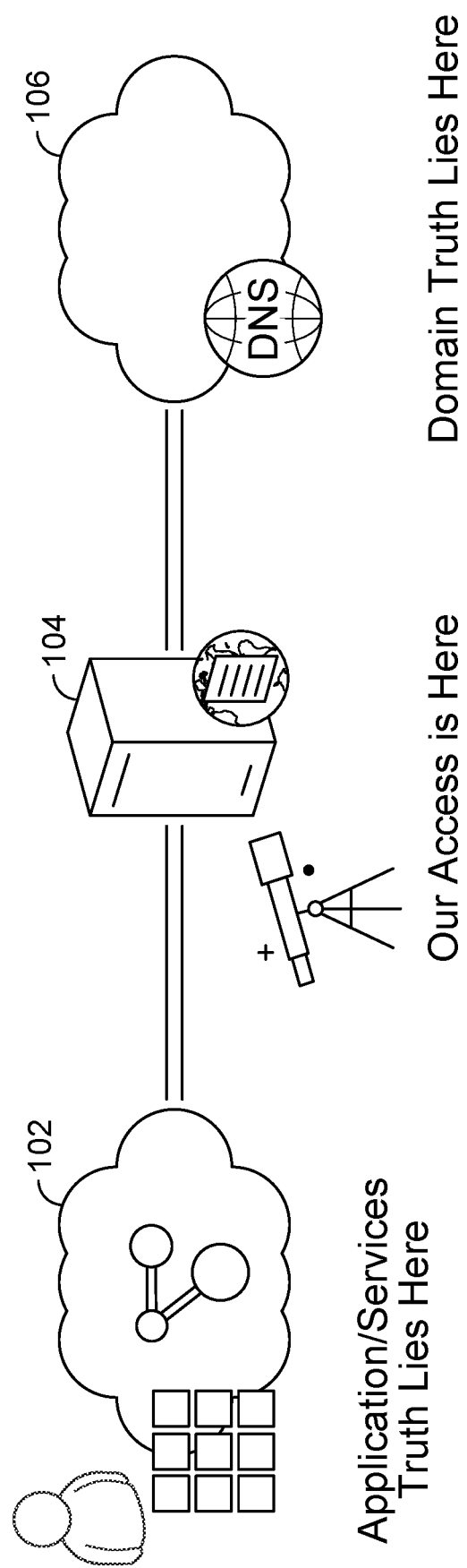
FIG. 1 illustrates an example customer network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain).

A blacklist (e.g., also referred to as a block list) generally refers to an access control mechanism that can be applied to, for example, URLs, domain names, IP addresses, and/or other names/addresses (e.g., email addresses, file names, etc.) to deny access to any such objects included on the blacklist.

A whitelist (e.g., also referred to as an allow list) refers to an access control mechanism that can be applied, for example, to URLs, domain names, IP addresses, and/or other names/addresses (e.g., email addresses, file names, etc.) to allow access to any objects included on the whitelist.

For example, a URL or domain name that is included on a blacklist can be applied by a DNS server and/or a web browser to deny access to a user's web browsing request to access that URL or domain name. As another example, a URL or domain name that is included on a whitelist can be applied by a DNS server and/or a web browser to allow access to a user's web browsing request to access that URL or domain name.

A blacklist and/or whitelist can be applied to provide enhanced access control and network security, such as for an enterprise network and/or home network. For example, blacklists and/or whitelists can be applied at a DNS server, firewall, email server, and/or another element in a network and/or host/endpoint device. For example, a DNS server can be configured to enforce a blacklist and/or whitelist that includes one or more web addresses (e.g., URLs including domain names and/or FQDNs), such as to block users from accessing malware websites or other unauthorized websites (e.g., alcohol, gambling, and/or other types of sites, based on a configured network/security policy for an enterprise network) or to allow users to access authorized websites (e.g., internal, preapproved, and/or other types of authorized sites, based on a configured network/security policy for an enterprise network), respectively.

Accordingly, new and improved techniques are needed for analysis of DNS activity on computing networks (e.g., enterprise networks).

System Embodiments for Query Prints (Qprints): Telemetry-Based Similarity for DNS Introduction A critical hurdle to providing customers (e.g., enterprise customers) with insights into their networks (e.g., enterprise networks) and actionable intelligence is the sheer volume of data, particularly for large customers. With volumes that easily exceed thirty million queries per day, there exists no ready way to comprehend the DNS activity, much less add meaning to it. Enterprise networks are generally configured in a multitude of ways, containing an unknown array of applications, and are often haunted by misconfigurations, adding to the complexity. While customers are keen to understand threats in their network, as well as shadow IT being used by employees, a service provider (e.g., a network/DNS service provider) typically does not have direct access to the true state of the customer network, the applications that reside within it, or the domains themselves.

FIG. 1 illustrates an example customer network environment. As shown in FIG. 1, our monitored observations of the customer networks are typically only able to facilitate partial information. Specifically, application/services truth lies as shown at 102, our monitored access typically resides at 104 (e.g., at a DNS server or other network gateway access points in an enterprise network), and domain truth typically lies as shown at 106.

As disclosed herein, Query Prints (Qprints) is a proposed paradigm that uses this partial information (e.g., gleaned from information that can be extracted/observed at location 104 of an enterprise network) to infer new details of both the domain space and the customer application space to facilitate telemetry-based similarity for DNS as will be further described below.

In one embodiment, Qprints is a new technique to express passive DNS (pDNS) data at-scale, and quantify similarity from them, within and across networks based on telemetry-based similarity for DNS. The disclosed new Qprints technique leverages big data in order to understand such data. For example, specific types of count data, derived from DNS observations over time, are combined with data science techniques to measure similarity and answer the following example type of questions, as listed below.

How similar is network A to network B?

How similar is network A to itself at another time?

Given a domain observed in a network, what other domains are similar to it, either in that network or another network?

How stable is a network's traffic?

How can a very large scale network be described by its Qprints?

Given activity for a domain in network A, are those observations consistent with external observations or due to network influence?

Can we characterize classes of domains and individual domains?

What patterns of activity exist in Internet domains and within vertical markets?

Accordingly, various techniques for Qprints using telemetry-based similarity for DNS are provided. In some embodiments, a system/process/computer program product for Qprints using telemetry-based similarity for DNS in accordance with some embodiments includes aggregating a set of network related event data, wherein the set of network related event data includes Domain Name System (DNS) related query data; clustering the DNS related query data; and generating similarity clusters for domains based on their DNS related query data. For example, the set of network related event data can include passive DNS (pDNS) data aggregated over a period of time to express passive DNS (pDNS) data at-scale, and similarity of the pDNS data aggregated over the period of time is quantified, within and across networks based on telemetry-based similarity for DNS using a statistical model.

Generally, Qprints is a telemetry-based technique; it assumes we will measure counts of a number of different DNS elements in our observation space. Like other telemetry-based approaches, it relies on subject matter expertise to determine what to measure, how to normalize, and how to interpret these measurements. Additionally, it generally relies on the Law of Large Numbers, which provides the foundation that, at-scale, Qprints have stability and represent the true distributions. This allows them to be compared. As such, these techniques often may not be appropriate for "the long tail" of DNS queries, for which there are very few observations. However, the disclosed Qprints techniques are generally applicable for providing telemetry-based analysis on the "body," which represents the vast majority of DNS traffic by volume. Once a set of telemetry metrics is chosen to be relevant to a specific problem, any number of data science and statistical techniques can be applied, such as will be further described herein.

In some embodiments, a Qprints is a representation of a single DNS domain (e.g., referring here to a fully qualified domain name (FQDN) at some level and not a DNS Zone), or in some contexts, a set of domains, by a count distribution of the relevant telemetry. As will be apparent to one of ordinary skill in the art in view of the below described embodiments, one can similarly use the same idea to represent other elements critical to DNS, such as IP addresses or name servers; however, for exposition, we will use only domains here in the below described embodiments. The query print is aggregated over some period of time and may include one or many of the following: (1) query type counts; (2) rcode counts; (3) unique subdomain counts; (4) total volumes; (5) number of answers and additional records (e.g., mean/median); (6) number of name servers (e.g., mean/median); (7) number of unique sources; and (8) time series-based counts (e.g., counts per minute or hour).

The potential scope of a query print is all things that can be observed and counted in passive DNS (pDNS). However, in most cases, only certain telemetries are relevant to certain questions. Defining these and refining their usage will take significant study for different use cases.

Qprints have potential impacts both in customer facing applications and internal research and development. For example, we can create statistics that score the similarity of a customer's network relative to external global networks or to others in their vertical. This will streamline decision making for the customer by allowing them to explore their data and understand the bulk of it in mass. We can also use these measurements internally to improve or create other capabilities. As another example, we can use the output of Qprints measurements as a first pass for application discovery or as a secondary check on other algorithms. Not only can these measurements allow us to reduce volumes in a very large network to better understand a smaller portion, but they can also reveal micro-characteristics in a network that should be elevated for further review.

Scope Overview

DNS query count distributions (e.g., it is noted that we are actually utilizing DNS response records, but most people informally use the term query data, as such, that term is also used herein) are known to follow an inverse power law known as Zipf s Law. Given that we have studied this extensively, we are able to leverage that work to make better decisions in this context. A consequence of using Zipf s Law in query counts is that the vast majority of unique domains makes up the vast minority of queries by volume. We are likely to find, for example, that more than 85% of the unique domains in a network make up less than 1% of the query volume. This extreme skew is often referred to as "the long tail."

While we might be able to aggregate information about the long tail over time or across networks, for a fixed set of observations, these queries carry little information. From a telemetry perspective, domains within it are nearly indistinguishable from one another. As such, Qprints is not an attempt to understand the long tail, although we can compare the metrics of one tail with another for similarity. Instead, as similarly mentioned above, the disclosed Qprints-based techniques are focused on the "body" that makes up the vast majority of a network's traffic.

Generally, the scope of the disclosed Qprints-based techniques is to represent the body of a network's query domains in a manner that leads to meaningful interpretations and measurements of similarity as will be further described herein. The further down the tail we go, the less distinction will exist in the observable data.

Modeling DNS from pDNS

A pDNS collection typically offers limited visibility to both the application or domain space but does contain a wide range of features that can be extracted and used to model those spaces. The exact features used will likely be use case dependent, but a core set of features will be found in common. In particular, we know from our experience that the following features can illuminate specific activity: (1) query types; (2) NXDOMAIN and answered query counts; (3) number of unique subdomains, both NXDOMAIN and answered; and (4) percentage of NXDOMAIN queries.

Other features that are expected to be useful (e.g., which may be network dependent or use case dependent) include the following: (1) non-rcode 0/3 responses; (2) seasonality measures (e.g., queries per hour); and (3) coverage measures (e.g., percentage of querying clients).

For the embodiments and uses cases described herein, we used the former set of features. We expect to expand upon these in a production deployment of Qprints.

In addition to features, there are a number of ways to model the domains and queries from the chosen telemetry. In our initial experiments, we used a combination of language models and statistical models. The language model allows us to take advantage of the large suite of techniques in Information Retrieval (IR) and Natural Language Processing (NLP) to compare domains. We considered both independent and joint models, using relatively naive approaches in all cases, and found joint language-stats models to outperform the individual approaches, at least by inspection. These approaches and results will now be described below.

Query Type (Qtype) Language Models and Applications

Observed at-scale, query responses for a given FQDN, and in aggregate an SLD, will have a stable distribution of query types and response code (rcode) responses. This combination of data is jointly controlled by the domain owners, who instantiate the respective DNS zones and associated configurations, as well as the applications that use them, which initiate queries for the domain. We do not have direct insight into either of these. The key insight is the use of a language model to infer information about the domain and applications, particularly similarity, from these distributions.

We can create a language model for domains based on rcode and query type (qtype) counts. In particular, we consider two rcodes: 0 and 3 (i.e., success and NXDOMAIN), as they are predominantly controlled by the domain owner and the applications that use them (e.g., it is noted that these can be influenced by DNS firewalls and transparent proxies, but overall, they are owner controlled). Other rcodes, such as rcode 2 (i.e., servfail) and rcode 5 (i.e., refused) are more reflective of the network at a particular point in time than the domains themselves. Generally, our goal is to model domains. As a result, we create a vocabulary of 512 "words," where each word is a combination of an rcode and a qtype.

For a given domain in a given network, we can create a bag-of-words (BoW) model using this vocabulary. In this context, the set of all queries for a domain in a network during a particular set of time is a document. The corpus of documents is all queries in the same context. We can then measure the similarity of documents in a number of traditional ways.

Once we have a BoW model, we can use data science and statistical techniques to address a wide range of questions, including the following example questions.

What does my network "look like" from a domain query perspective?

How can I summarize very large volumes into groups of similar behavior?

What domains are similar to each other, and how do I identify outliers and anomalies?

How does my network change over time?

Given a domain, what other domains are similar to it in my network?

Do my network queries look similar to those in external networks?

We could also then compare networks, both to themselves over time and to others.

This language model gives us a way to express an aggregated set of domain queries in a uniform way; however, normalizing and choosing distance metrics for the model vector space still remains. In particular, we have to consider how to treat magnitude, or the number of queries for a domain, given that we know there is a Zipf's Law distribution in the counts. Ignoring magnitude will result in a loss of information (e.g., Jaccard Similarity) but keeping it will result in a wide separation of the domains. In our experiments, we evaluated several approaches. The results shared here generally use a TF-IDF (e.g., sublinear TF mapping) model containing a log(TF) normalization. This approach respects but dampens magnitude.

Domain Similarity

Once we have a query print concept, we can ask how similar one domain is to another, within and across networks. Doing queries across networks will take some refinement of features and normalization. In these experiments, similarity uses a TF-IDF model with a log(TF) normalization. Similarity between two domains is in the range [0, 1], with 1 being identical representations.

FIG. 2A illustrates results for domain similarity using query prints (Qprints) in accordance with some embodiments. We implemented this in example Customer C traffic using a day of data and the bag-of-words model for rcode/qtypes. Although this is naive and does have noise, queries can result in interesting similarities. The results are illustrated in FIG. 2A. Specifically, as shown in FIG. 2A, we are able to see some grouping of CDN and CDN-like domains. Google.com, for example, is similar with expected well-known domains (e.g., Akamaiedge.net as shown in FIG. 2A). Later, we will compare results using a combined model.

FIG. 2B illustrates results for domain similarity by feature distribution using Qprints in accordance with some embodiments. If we look at the similarity by feature distribution, we can see how they are related, or in some cases, not related. In what follows, a TF-IDF is used for the similarity matrix. The similarity score is 0.93 in the first pair and 0.89 in the second. As shown in FIG. 2B, we can see that in the google[.]com qtype, 33 records were queried and failed; however, this is not seen in facebook[.]com queries. These results can also help with application discovery.

Tuning work on the normalization and metric can be performed here to make this useful in any generic setting. Different use cases for the similarity will generally utilize a different normalization and metric. This approach de-emphasizes the magnitude of queries, which is both a blessing and a curse. If magnitude is not considered, all of the variation of domain queries, or their rank, is compressed into a simple magnitude. However, if magnitude is considered, the top domains, like google[.]com, will appear dissimilar from all other domains because of the difference in magnitude. In the above example, we normalize counts by smoothing magnitude with a log approximation and then taking the TF-IDF.

Figure 3:
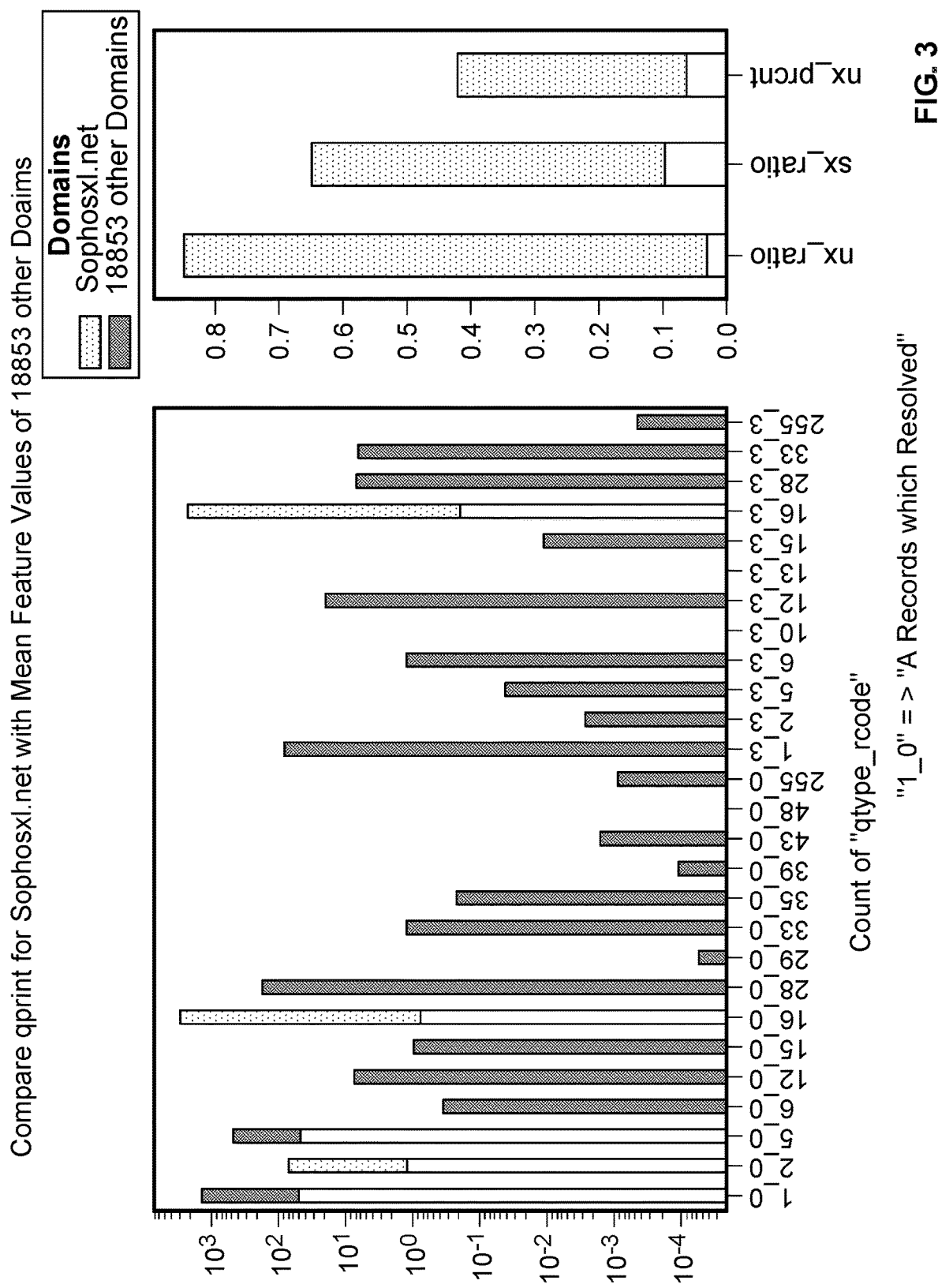
FIG. 3 illustrates graphs of a comparison using Qprints for sophosxl.net with mean feature values of 18853 other domains in accordance with some embodiments.

FIG. 3 illustrates graphs of a comparison using Qprints for sophosxl.net with mean feature values of 18853 other domains in accordance with some embodiments. The features shown in this example include a combination of (query type, rcode), unique subdomain counts (nx and success), and nxdomain percentage. For the sophosxl.net domain, the results are dominated by TXT records, highly variant subdomains, and a high nxdomain count.

Domain similarity has many applications. As an example, it can be used by customers or internally by enterprises to gain potential context for an unusual domain. It can be used for tasks like truth marking algorithms or locating similar domains for application discovery, but it also can be a helpful tool for identifying and troubleshooting network configurations or errant applications. However, it is limited in the sense that given that it is query-driven, you start with a domain.

Qtype Clustering and Summaries

While domain similarity is quite useful for identifying domains that are similar to a given seed domain, it is limited. Aside from being query-driven, it also is not guaranteed to return truly similar domains. Clustering, on the other hand, does exactly that; it will group domains into cohesive sets that represent a similar set of activity.

Normalization and distance, as well as cluster tuning, are all critical research areas for applications. In particular, certain use cases can preserve the volume of counts, or magnitude, of each feature, and will thus involve magnitude-preserving normalization and measures. We can also apply smoothing functions in many cases, as well. While clustering is an entirely unsupervised problem, we may also leverage other knowledge to create semi-supervised approaches.

Figure 4A:
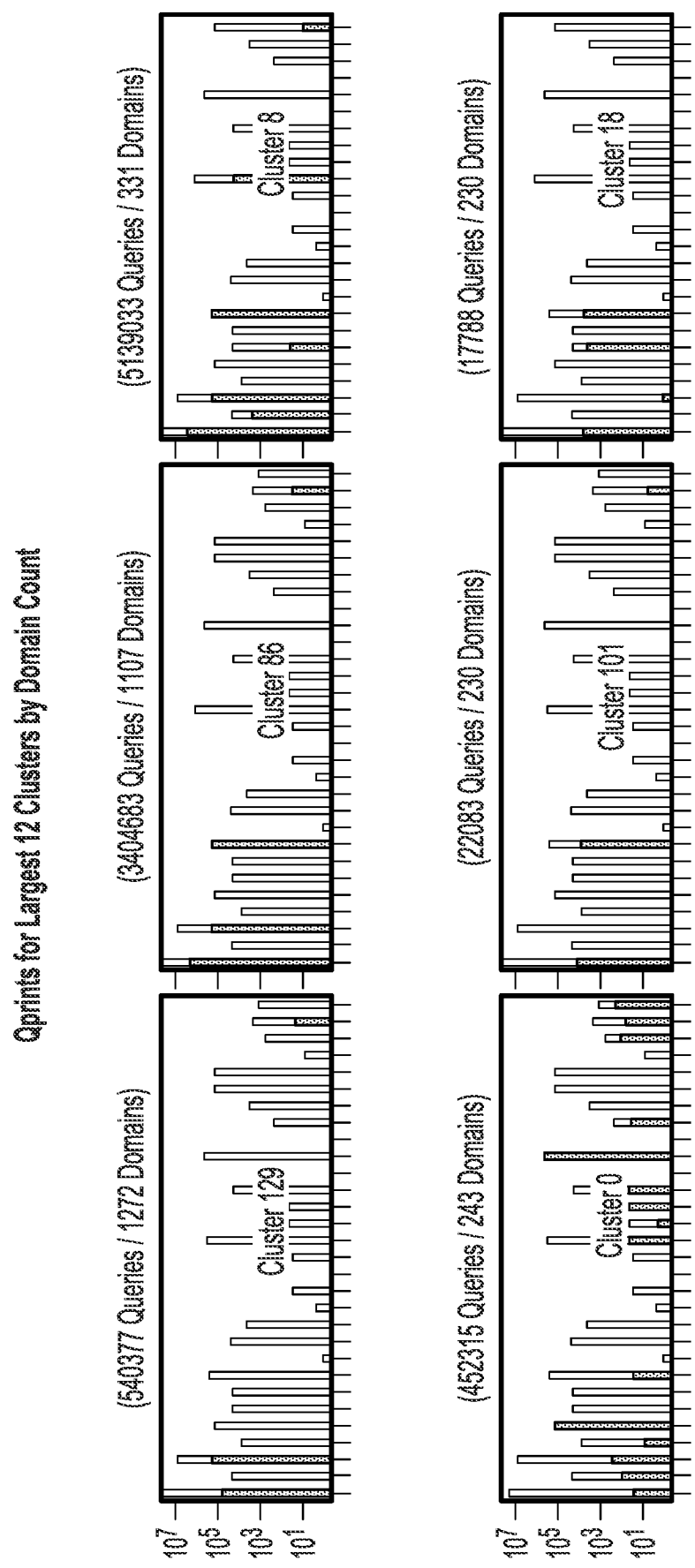
FIG. 4A illustrates graphs of Qprints for the largest 12 clusters by domain count in accordance with some embodiments.
Figure 4A:
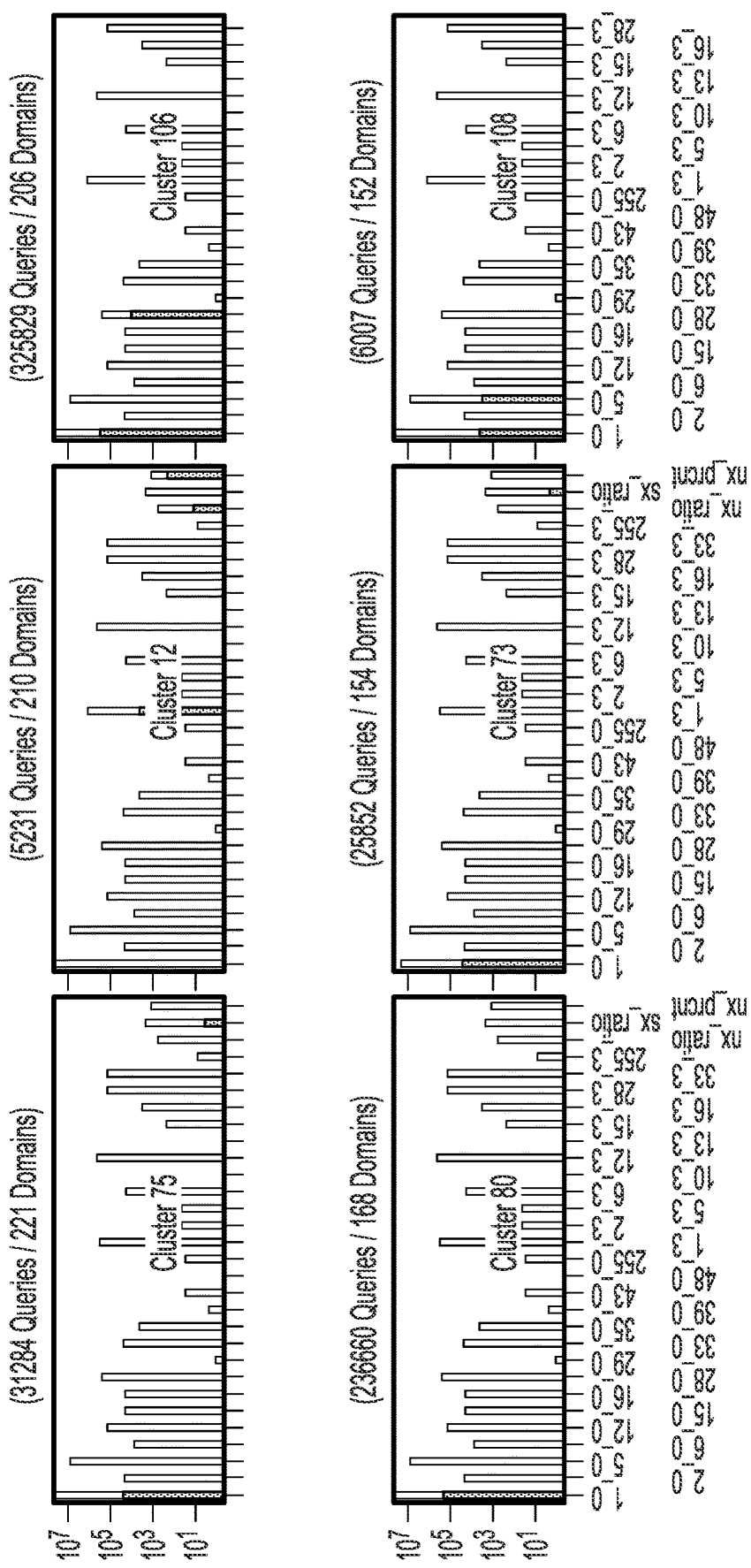
Figure 4B:
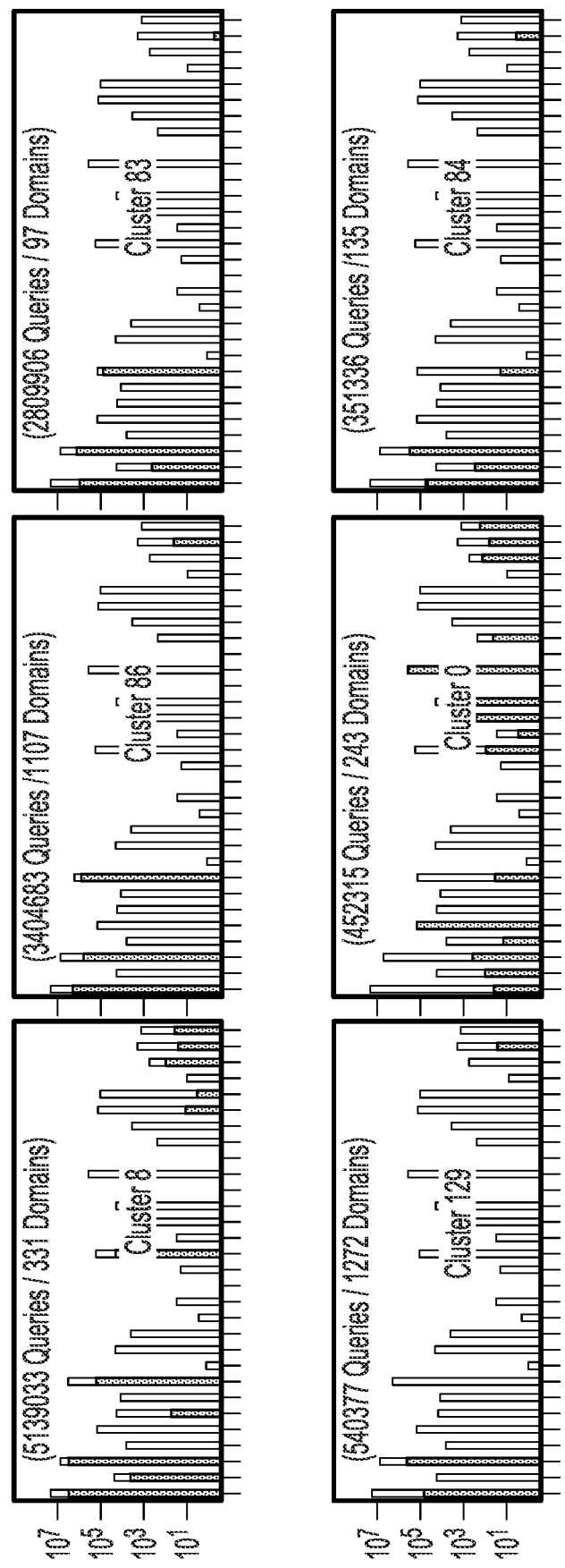
FIG. 4B illustrates graphs of Qprints for the largest 12 clusters by query count in accordance with some embodiments.
Figure 4B:
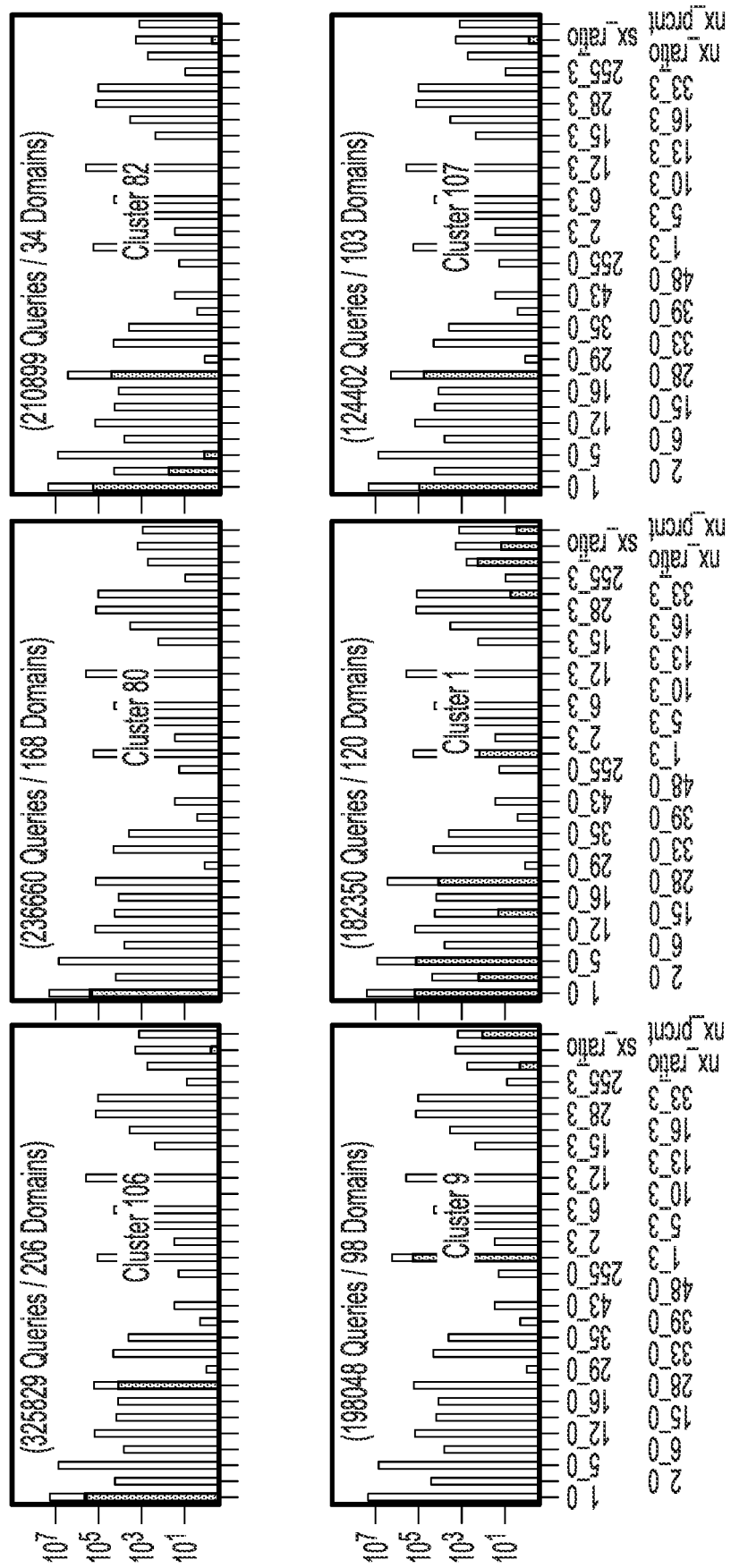

FIG. 4A illustrates graphs of Qprints for the largest 12 clusters by domain count in accordance with some embodiments. FIG. 4B illustrates graphs of Qprints for the largest 12 clusters by query count in accordance with some embodiments. As will now be described, we have created some example implementations based on enterprise customers. In these example implementations, we use the qtype language model described above and cluster with the density-based algorithm, HDBSCAN. We used a term-frequency model to ensure magnitude was maintained. In the examples shown below, the tail was dropped by selecting only domains that had at least 20 queries total in a day.

In these examples, as shown in FIGS. 4A and 4B, although the majority of queries are not clustered (e.g., it is noted that HDBSCAN works under the philosophy "don't be wrong," and so in an untuned sparse environment it will have lots of outliers), those that are contain a strong qtype pattern. Each cluster is represented by a plot that shows the distribution of the cluster in a dark fill, against the distribution of all the data in a light fill. The distribution here is in the rcode-qtype vocabulary we defined above. For example, referring now to FIG. 4B, the x-axis contains the 'words' present in this network, represented as simple strings. For example, a resolved A record is represented in these plots as "1_0." The y-axis is a log scale, so small changes reflect increasingly large volumes. Notably, the largest cluster (by query volume) contains only NXDOMAIN A record responses. Notice also that large clusters of PTR records (e.g., both resolved and NXDOMAINs) and CNAME/A record queries exist. The clusters of A records that are distinct are representative of gaps in the total number of queries for the domains in those clusters.

Referring to FIGS. 4A and 4B, these charts may appear complicated at first, but ultimately are concisely representing very large volumes of data (e.g., these charts reduce the complication of the underlying data that corresponds to more than 50 million DNS records of pDNS data). Once comprehended, they can help understand this particularly unusual network much better. For example, the disclosed Qprints-based analysis can facilitate characterizing an enterprise network, establishing baselines for change detection on an enterprise network (e.g., a benchmark for a large network), identifying applications used on an enterprise network, and detecting groups of suspicious domains.

Examples of applications of the disclosed Qprints techniques include the following:
(1) reduce analytic burden to understand reported issues in enterprise networks (e.g., customer networks) and threat detections;
(2) application discovery on an enterprise network;
(3) characterizing networks for customers;
(4) discovery of threats and trends in customer data;
(5) change detection across established clusters;
(6) identifying misconfiguration in an enterprise network;
(7) annotate clusters with threat for prioritization; and
(8) domain monitoring.

FIG. 5A illustrates representative clusters by query volume in accordance with some embodiments. If we look at representative domains from each of these example clusters by query volume, we find results such as shown in FIG. 5A. Notice the obvious clusters of PTR records (e.g., clusters 0, 1, and 2), but also clusters that look like domain generation algorithms (DGAs), such as cluster 28 in this example.

In the representative domain samples of clusters, such as shown in FIG. 5A, we can see some clear patterns, while other clusters do not contain obvious domains. Clusters 0, 1, and 2 all appear to be PTR record related. Cluster 6 appears to be a set of electronic mail related domains. Cluster 14 appears to be potential look alike domains (e.g., suspicious/potentially malicious domains that appear to be confusingly similar to well-known legitimate domains). Cluster 28 has a DGA-like set of domains.

FIG. 5B illustrates another representative cluster by query volume in accordance with some embodiments. As shown in FIG. 5B, another representation of this space (e.g., using different parameters so the cluster numbers do not align) shows how a DGA can be picked up using the combination of qtypes and resulting magnitudes of queries. As shown, we see what clearly is a DGA-type cluster (e.g., including katunaq.com) with similar, but not identical, query volumes, all of which are successful A records. Smoothing the magnitude with a log function helps group these domains together.

Figure 6:
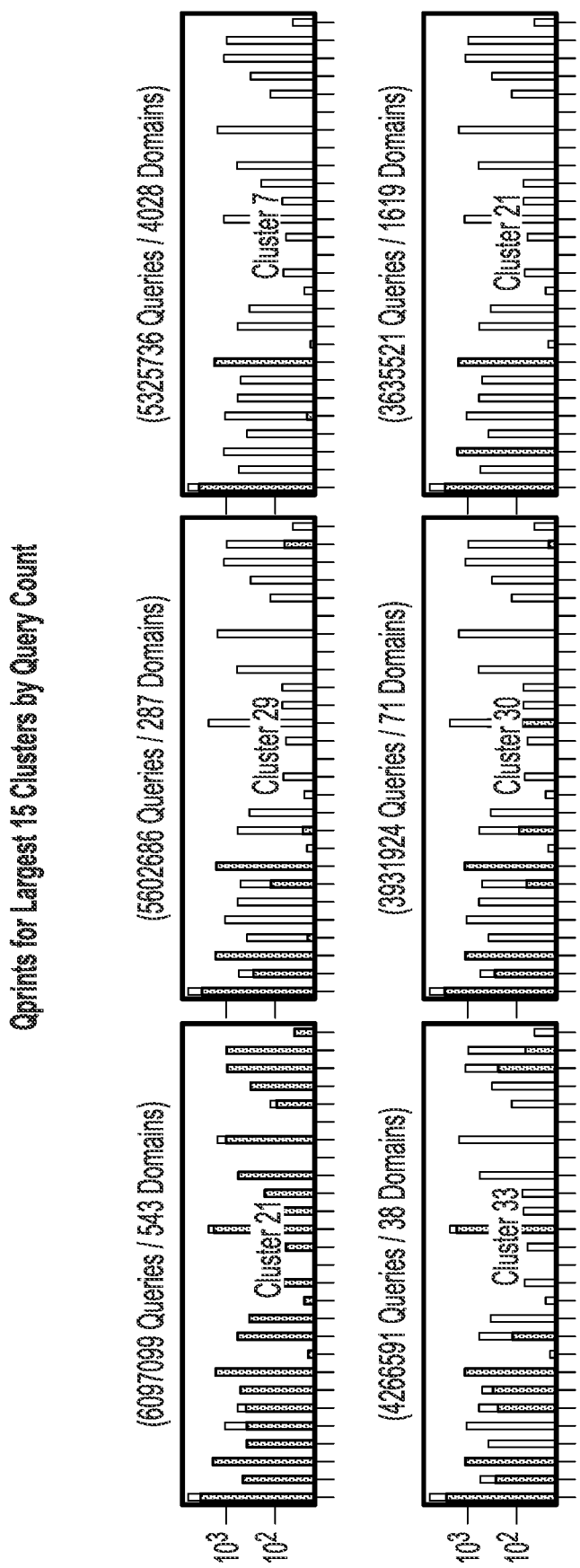
FIG. 6 illustrates graphs of Qprints for the largest 12 clusters by query count in accordance with some embodiments.
Figure 6:
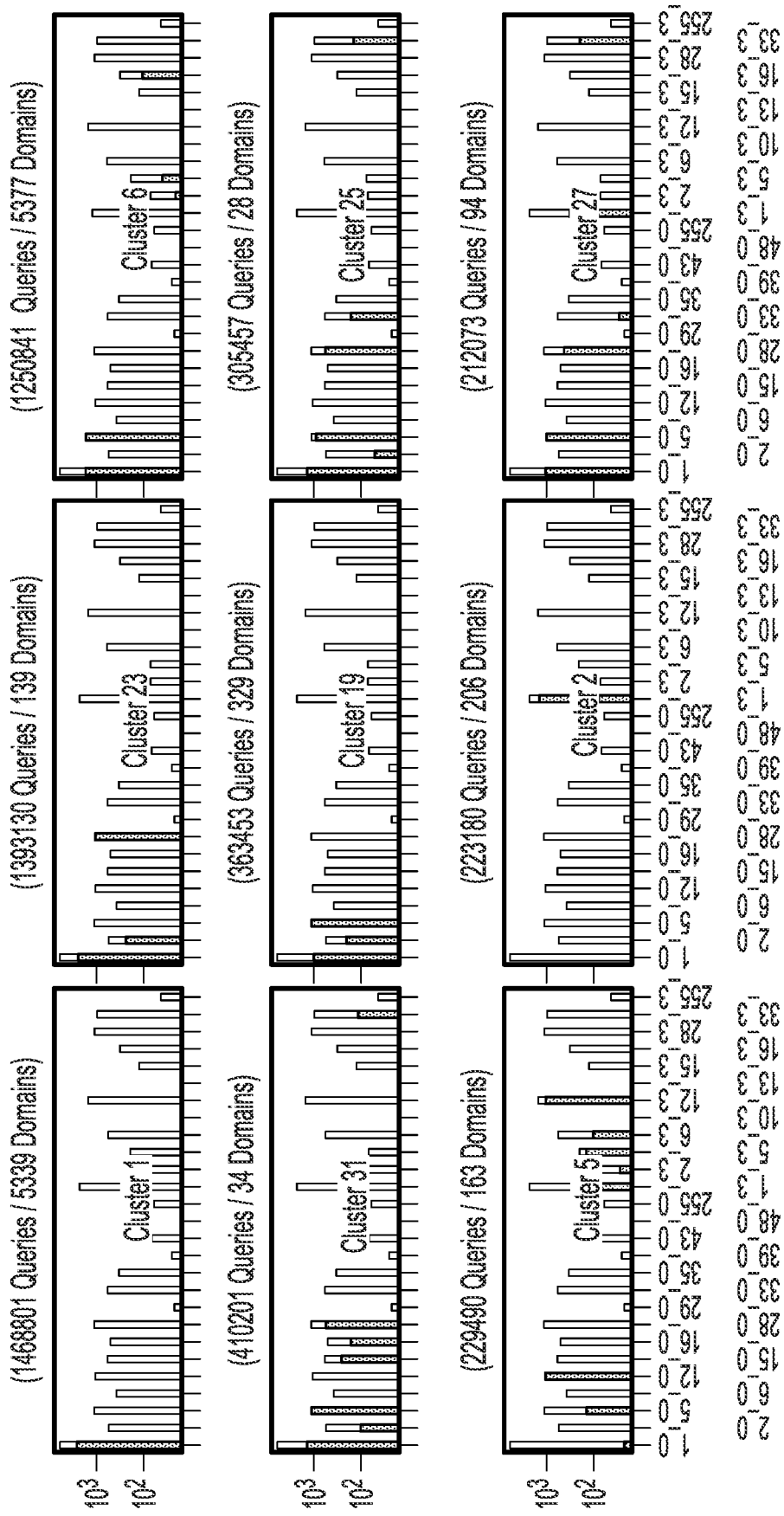

FIG. 6 illustrates graphs of Qprints for the largest 12 clusters by query count in accordance with some embodiments. For a different customer (e.g., customer B), we see that the cluster distribution is significantly different. Again, the majority of domains, with this set of parameters, are 'outliers;' however, millions of records are clustered. Visually, we can see these networks are once again, very different. As such, using these Qprints techniques, we can also create a single similarity measure that demonstrates that difference numerically.

Qname Statistics Clustering and Summaries

Figure 7:
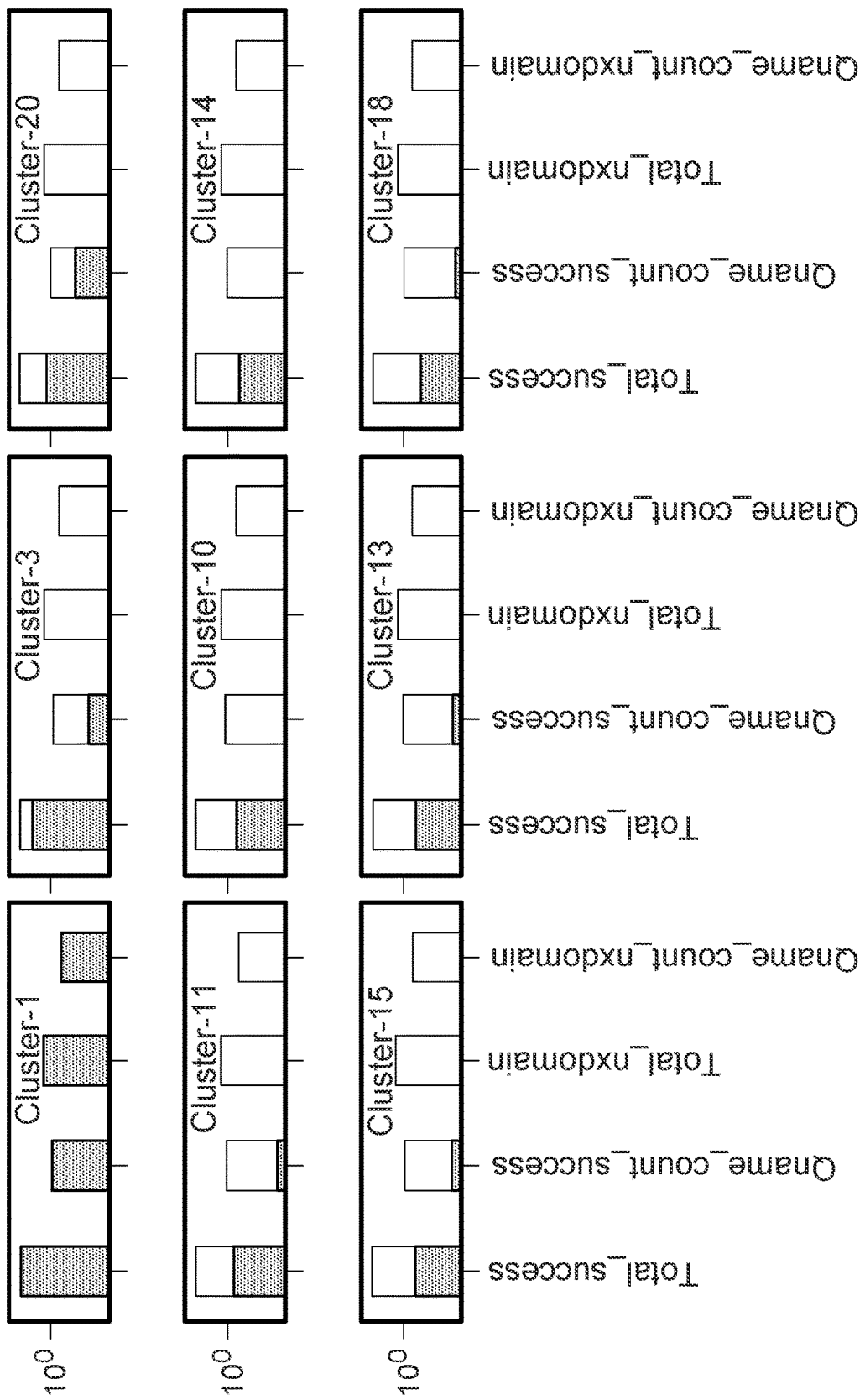
FIG. 7 illustrates graphs of Qprints for the largest 9 clusters by query count in accordance with some embodiments.

FIG. 7 illustrates graphs of Qprints for the largest 9 clusters by query count in accordance with some embodiments. In addition to qtype telemetry features, we can use descriptive statistics about the domain counts and subdomain counts. In this example, we created a Qprints example implementation using four features for three Enterprise customers. The four features used here are per SLD:
(1) total resolved queries,
(2) unique resolved subdomains,
(3) total NXDOMAIN queries, and
(4) unique NXDOMAIN subdomains.

By themselves, these four features struggle to describe the micro-structure of a large network, but they can lead us to macro elements and critical outliers that will allow us to understand the network better.

As shown in FIG. 7, we can see clustering based on the four statistical features in a very large network, representing over 37 million DNS records per day.

Combined Similarity and Other Telemetry

We can combine these various types of telemetry, as well as others, to create a better aggregated picture. The work here will be in refining the normalization and distance measures to use when combining inherently different types of underlying data. We have example implementations for combinations of qtype and qname query prints. In addition, we can utilize mean and standard deviations for answer counts, name server counts, and additional record counts in DNS responses. We are also able to use the percentage of unique query IPs, or sources, within a network as another feature of spread.

FIG. 8 illustrates a comparison of the top 10 matches to sophosxl.net using three similarities in accordance with some embodiments. As shown in FIG. 8, for the domain sophosxl[.]net, we can see that the resulting ten most similar domains in the joint model are more representative than either of the language or statistical model. In particular, the joint model picks up additional anti-virus/reputation checking services that the simpler models do not. This example uses a naive combination of the two models by taking the mean of the two similarity scores.

Example Applications

In this section, we will discuss various example applications of Qprints. We anticipate a wide array of applications of Qprints. As an example, for DNS and security service entities, Qprints can be used for various applications for assisting their enterprise customers. These include threat analysts, network operations center (NOC) analysts, customer support managers, data scientists, and support engineers that may use the capabilities to provide better products and services to customers. Additionally, customer-facing applications may enhance their ability to understand their internal network and prioritize resolution of discovered issues. This section outlines some of the applications of the disclosed Qprints as will be further described below.

Similar Domain Search

Domain search, as described above, is a direct application, in which customers or internal users can query domains with respect to a network to find similar domains. Additionally, there can be mechanisms for them to compare this Qprint with an external Qprint of the same domain.

Network Summarization

We can use a variety of techniques to describe the network. In the above-described experiments, we specifically used techniques such as distribution Qprints like those above, as well as showing representative domains. A number of other approaches can be used, including text descriptions of the features and word clouds sized by the number of subdomains or query counts.

Domain Characterization

Over time, we can characterize a domain itself by aggregating observations across many networks and time. This will facilitate a deeper understanding of how domains are configured in their authoritative servers and how applications utilize them.

Domain Change and Anomaly Detection

Another potentially significant application space of the disclosed Qprints techniques is change and anomaly detection. Once a Qprint is established for a domain within a network, we can compare new observations, as a set or individually, to see how likely the new observations are to be normal. For example, one can imagine domain monitoring of partners and supply chains within a customer network for targeted attacks that exploit those domains.

Application and Service Discovery

The disclosed Qprints techniques can assist with application and service discovery efforts by both identifying clusters of similar domains, which are all tightly correlated by behavior, and utilizing similarity search. This can be used to create noisy labels for various related machine learning efforts as well.

Internet Trending

By gathering large-scale understanding of domain Qprints across the customer set, and with additional accesses, we can understand changes in the Internet environment that may impact our customer's experience and our product performance. We can potentially identify ways to optimize the customer experience based on these trends, either within their network or compared with external networks.

Identifying Misconfigurations

Qprints can also be applied to invalid TLDs, which can highlight misconfigurations in a customer's network. As an example, in the case of valid TLDs, it can highlight differences between a customer network use of a domain and external use, which may indicate issues such as search domains leaking to the external network.

Figure 9:
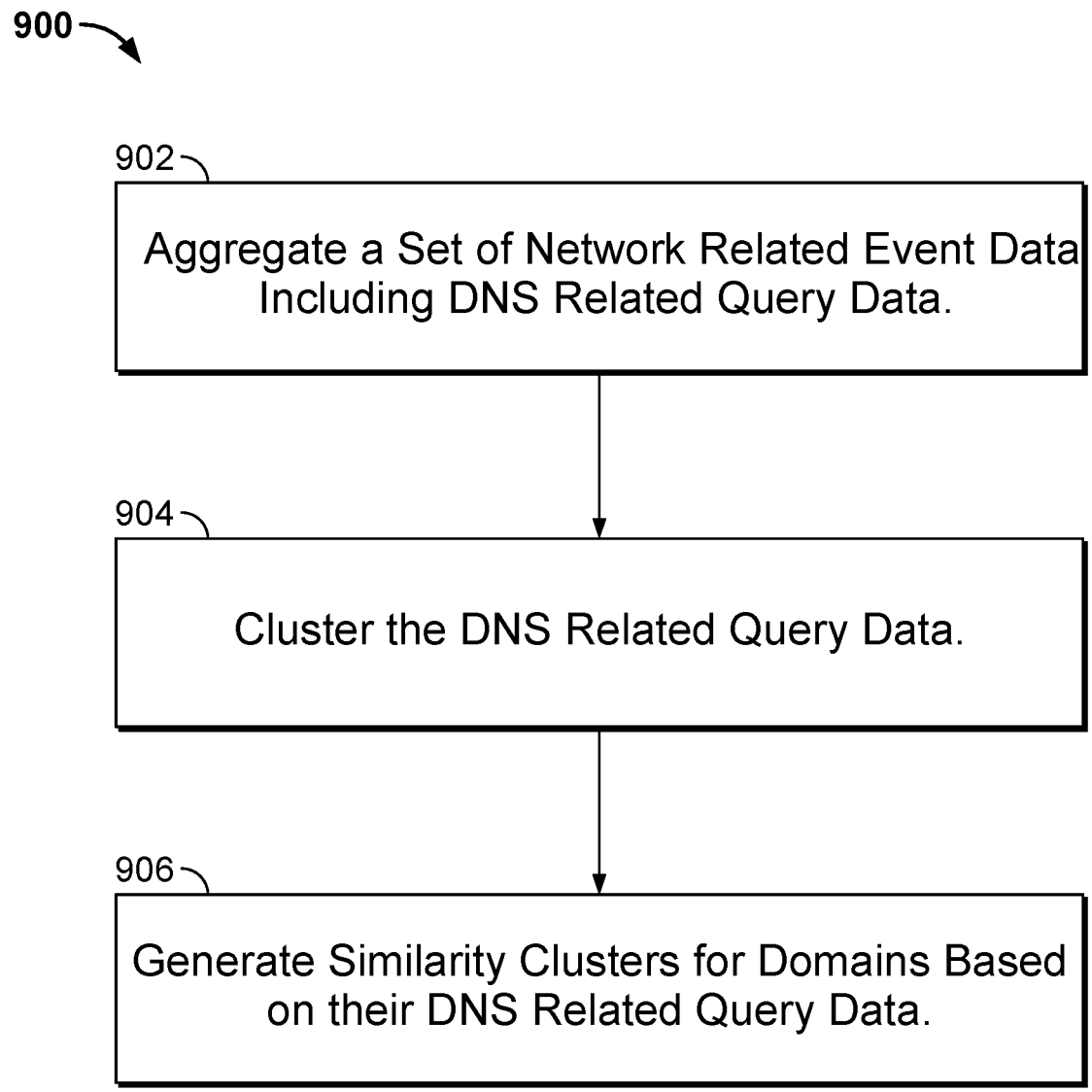
FIG. 9 is a flow diagram illustrating a process for Qprints using telemetry-based similarity for DNS in accordance with some embodiments.

Example Processes for Query Prints (Qprints):
Telemetry-Based Similarity for DNS FIG. 9 is a flow diagram illustrating a process for Qprints using telemetry-based similarity for DNS in accordance with some embodiments. In various embodiments, process 900 is performed by the system(s) and processing techniques described above with respect to FIGS. 1 through 8.

At 902, a set of network related event data is aggregated. For example, the set of network related event data can include Domain Name System (DNS) related query data.

At 904, clustering the DNS related query data is performed. For example, clustering the DNS related query data can be performed as similarly described above.

At 906, generating similarity clusters for domains based on their DNS related query data is performed. For example, similarity clusters for domains based on their DNS related query data can be performed as similarly described above.

Figure 10:
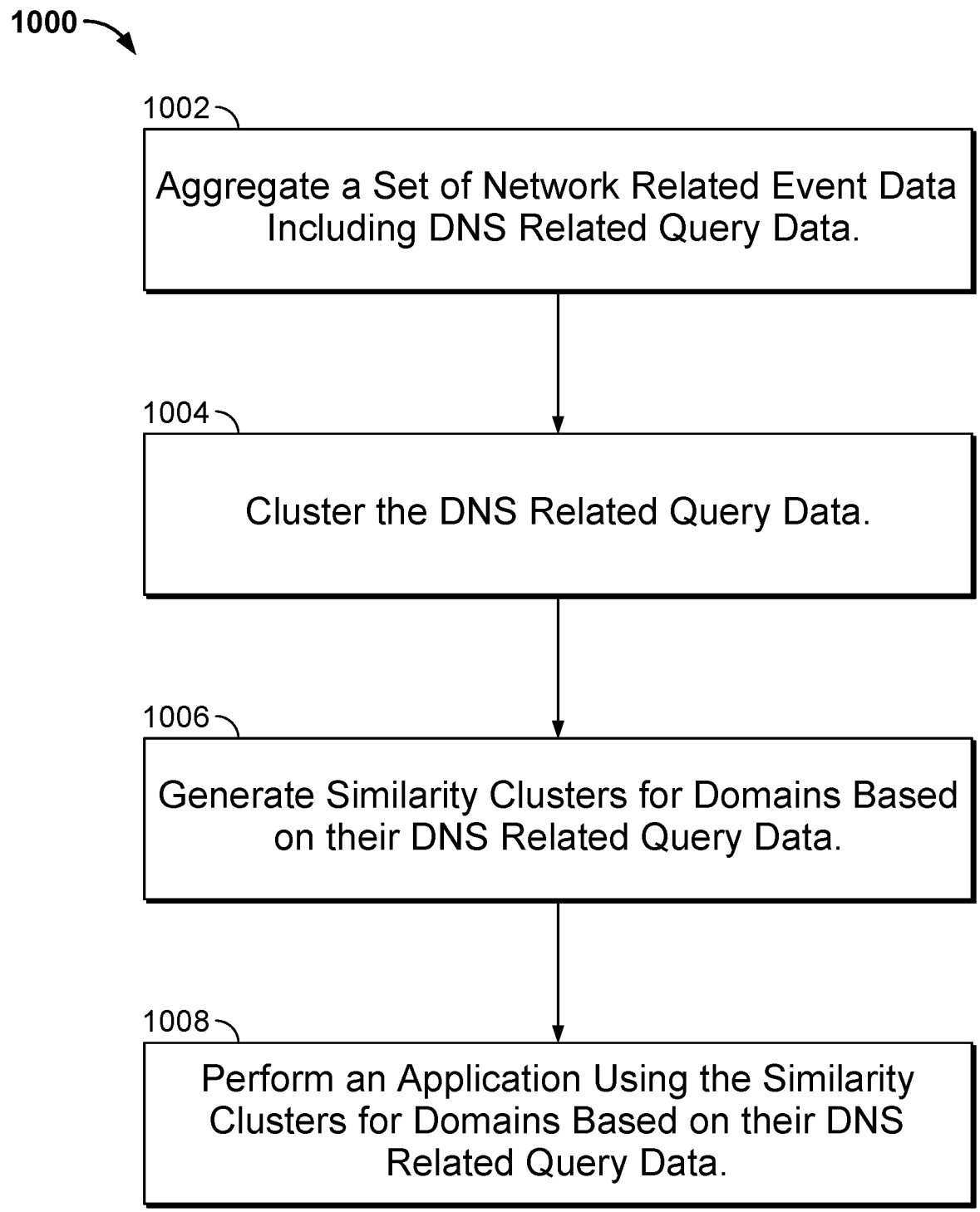
FIG. 10 is another flow diagram illustrating a process for Qprints using telemetry-based similarity for DNS in accordance with some embodiments.

FIG. 10 is another flow diagram illustrating a process for Qprints using telemetry-based similarity for DNS in accordance with some embodiments. In various embodiments, process 1000 is performed by the system(s) and processing techniques described above with respect to FIGS. 1 through 8.

At 1002, a set of network related event data is aggregated. For example, the set of network related event data can include Domain Name System (DNS) related query data.

At 1004, clustering the DNS related query data is performed. For example, clustering the DNS related query data can be performed as similarly described above.

At 1006, generating similarity clusters for domains based on their DNS related query data is performed. For example, similarity clusters for domains based on their DNS related query data can be performed as similarly described above.

At 1008, an application is performed using the similarity clusters for domains based on their DNS related query data. For example, the application can include one or more of the following types of applications: similar domain search, network summarization, domain characterization, domain change and anomaly detection, application and service discovery, and Internet trending.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
aggregate a set of network related event data, wherein the set of network related event data includes Domain Name System (DNS) related query data, comprising to:
create a vocabulary including a plurality of words, wherein a word of the plurality of words corresponds to a combination of a response code and a query type; and
generate a model for a given domain based on the vocabulary;
generate similarity clusters for domains based on the DNS related query data, comprising to:
group, based on the model, domains having a similar behavior to obtain a similarity cluster; and
perform an application using the similarity clusters for domains; and
a memory coupled to the processor and configured to provide the processor with instructions.

2. The system recited in claim 1, wherein the set of network related event data includes passive DNS (pDNS) data.

3. The system recited in claim 1, wherein the set of network related event data includes passive DNS (pDNS) data aggregated over a period of time.

4. The system recited in claim 1, wherein the set of network related event data includes passive DNS (pDNS) data aggregated over a period of time to express passive DNS (pDNS) data at-scale, and similarity of the pDNS data aggregated over the period of time is quantified, within and across networks based on telemetry-based similarity for DNS using a statistical model.

5. The system recited in claim 1, wherein the set of network related event data includes DNS related query data associated with a first enterprise network and DNS related query data associated with a second enterprise network.

6. The system recited in claim 1, wherein the processor is further configured to:
compare DNS activities within a first enterprise network based on a baseline of DNS activity associated with the first enterprise network.

7. The system recited in claim 1, wherein the processor is further configured to:
detect anomalous network activity within a first enterprise network based on a baseline of DNS activity associated with the first enterprise network.

8. The system recited in claim 1, wherein the processor is further configured to:
compare DNS activities between a first enterprise network and other enterprise networks.

9. The system recited in claim 1, wherein:
the set of network related event data includes passive DNS (pDNS) data aggregated over a period of time to express pDNS data at-scale, and quantify similarity of the pDNS data aggregated over the period of time, within and across networks based on telemetry-based similarity for DNS; and
the performing of the application comprises to:
perform a similar domain search using the pDNS data aggregated over the period of time.

10. The system recited in claim 1, wherein:
the set of network related event data includes passive DNS (pDNS) data aggregated over a period of time to express pDNS data at-scale, and quantify similarity of the pDNS data aggregated over the period of time, within and across networks based on telemetry-based similarity for DNS; and
the performing of the application comprises to:
perform a network summarization using the pDNS data aggregated over the period of time.

11. The system recited in claim 1, wherein:
the set of network related event data includes passive DNS (pDNS) data aggregated over a period of time to express pDNS data at-scale, and quantify similarity of the pDNS data aggregated over the period of time, within and across networks based on telemetry-based similarity for DNS; and
the performing of the application comprises to:
perform a domain characterization using the pDNS data aggregated over the period of time.

12. The system recited in claim 1, wherein:
the set of network related event data includes passive DNS (pDNS) data aggregated over a period of time to express pDNS data at-scale, and quantify similarity of the pDNS data aggregated over the period of time, within and across networks based on telemetry-based similarity for DNS; and
the performing of the application comprises to:
detect a domain change and/or anomaly using the pDNS data aggregated over the period of time.

13. The system recited in claim 1, wherein:
the set of network related event data includes passive DNS (pDNS) data aggregated over a period of time to express pDNS data at-scale, and quantify similarity of the pDNS data aggregated over the period of time, within and across networks based on telemetry-based similarity for DNS; and
the performing of the application comprises to:
identify a network misconfiguration using the pDNS data aggregated over the period of time.

14. The system recited in claim 1, wherein:
the set of network related event data includes passive DNS (pDNS) data aggregated over a period of time to express pDNS data at-scale, and quantify similarity of the pDNS data aggregated over the period of time, within and across networks based on telemetry-based similarity for DNS; and
the performing of the application comprises to:
perform service discovery using the pDNS data aggregated over the period of time.

15. A method, comprising:
aggregating a set of network related event data, wherein the set of network related event data includes Domain Name System (DNS) related query data, comprising:
creating a vocabulary including a plurality of words, wherein a word of the plurality of words corresponds to a combination of a response code and a query type; and
generating a model for a given domain based on the vocabulary;
generating similarity clusters for domains based on the DNS related query data, comprising:
grouping, based on the model, domains having a similar behavior to obtain a similarity cluster; and
performing an application using the similarity clusters for domains.

16. The method of claim 15, wherein the set of network related event data includes passive DNS (pDNS) data.

17. The method of claim 15, wherein the set of network related event data includes passive DNS (pDNS) data aggregated over a period of time.

18. The method of claim 15, wherein the set of network related event data includes passive DNS (pDNS) data aggregated over a period of time to express passive DNS (pDNS) data at-scale, and similarity of the pDNS data aggregated over the period of time is quantified, within and across networks based on telemetry-based similarity for DNS using a statistical model.

19. A computer program product, the computer program product being embodied in a tangible non-transitory computer readable storage medium and comprising computer instructions for:
aggregating a set of network related event data, wherein the set of network related event data includes Domain Name System (DNS) related query data, comprising:
creating a vocabulary including a plurality of words, wherein a word of the plurality of words corresponds to a combination of a response code and a query type; and
generating a model for a given domain based on the vocabulary;
generating similarity clusters for domains based on the DNS related query data, comprising:
grouping, based on the model, domains having a similar behavior to obtain a similarity cluster; and
performing an application using the similarity clusters for domains.

20. The computer program product recited in claim 19, wherein the set of network related event data includes passive DNS (pDNS) data aggregated over a period of time to express pDNS data at-scale, and similarity of the pDNS data aggregated over the period of time is quantified, within and across networks based on telemetry-based similarity for DNS using a statistical model.

* * * * *